(12) United States Patent
Nakamura et al.

(10) Patent No.: US 11,355,766 B2
(45) Date of Patent: Jun. 7, 2022

(54) FUEL CELL MODULE AND FUEL CELL APPARATUS

(71) Applicants: KYOCERA CORPORATION, Kyoto (JP); DAINICHI CO., LTD., Niigata (JP)

(72) Inventors: Mitsuhiro Nakamura, Kirishima (JP); Mitsutaka Shimada, Kirishima (JP); Kyosuke Yamauchi, Kirishima (JP); Michitada Okada, Kirishima (JP)

(73) Assignees: KYOCERA Corporation, Kyoto (JP); DAINICHI CO., LTD., Niigata (JP)

( * ) Notice: Subject to any disclaimer, the term of this patent is extended or adjusted under 35 U.S.C. 154(b) by 355 days.

(21) Appl. No.: 16/344,369

(22) PCT Filed: Oct. 27, 2017

(86) PCT No.: PCT/JP2017/039009
§ 371 (c)(1),
(2) Date: Apr. 24, 2019

(87) PCT Pub. No.: WO2018/079751
PCT Pub. Date: May 3, 2018

(65) Prior Publication Data
US 2019/0260051 A1      Aug. 22, 2019

(30) Foreign Application Priority Data
Oct. 31, 2016 (JP) .............................. JP2016-213769

(51) Int. Cl.
*H01M 8/0606* (2016.01)
*H01M 8/04* (2016.01)
*H01M 8/12* (2016.01)

(52) U.S. Cl.
CPC .......... *H01M 8/0606* (2013.01); *H01M 8/04* (2013.01); *H01M 8/12* (2013.01); *Y02P 70/50* (2015.11)

(58) Field of Classification Search
None
See application file for complete search history.

(56) References Cited

U.S. PATENT DOCUMENTS

| 2010/0167154 A1 | 7/2010 | Ono |
| 2011/0117457 A1* | 5/2011 | Nakamura ......... H01M 8/2425 429/408 |
| 2017/0084940 A1 | 3/2017 | Kawabata et al. |

FOREIGN PATENT DOCUMENTS

| JP | 2009158121 A | 7/2009 |
| JP | 2011009036 A * | 1/2011 |

(Continued)

*Primary Examiner* — Tracy M Dove
(74) *Attorney, Agent, or Firm* — Viering, Jentschura & Partner MBB

(57) ABSTRACT

A fuel cell module may include: a cell stack device including a cell stack including an array of a plurality of fuel cells, a manifold which supplies a fuel gas to each of the fuel cells, and a reformer which reforms a raw fuel; an oxygen-containing gas flow channel through which the oxygen-containing gas flows; an oxygen-containing gas introduction plate which supplies the oxygen-containing gas to each of the plurality of fuel cells; a housing including a box body of which one side is opened to provide an opening and a lid (closed plate) which closes the opening; a gas pipe joint, an ignition heater, a thermocouple, etc. which are a plurality of insertion members inserted from an outside of the housing into an accommodation chamber, the respective insertion members being inserted through one surface (lid surface) of the housing.

9 Claims, 6 Drawing Sheets

(56) References Cited

FOREIGN PATENT DOCUMENTS

| | | | |
|---|---|---|---|
| JP | 2011009036 | A | 1/2011 |
| JP | 2014191895 | A | 10/2014 |
| JP | 2016100274 | A | 5/2016 |
| JP | 2016157571 | A | 9/2016 |
| JP | 2016177905 | A * | 10/2016 |
| JP | 2016177905 | A | 10/2016 |
| WO | 2009119615 | A1 | 10/2009 |
| WO | 2015141752 | A1 | 9/2015 |

* cited by examiner

FUEL CELL MODULE AND FUEL CELL APPARATUS

CROSS-REFERENCE TO RELATED APPLICATIONS

This application is a national stage entry according to 35 U.S.C. 371 of International Application No. PCT/JP2017/039009 filed on Oct. 27, 2017, which claims priority to Japanese Patent Application No. 2016-213769 filed on Oct. 31, 2016, which are entirely incorporated herein by reference.

TECHNICAL FIELD

The present disclosure relates to a fuel cell module and a fuel cell apparatus.

BACKGROUND

A fuel cell module may include a cell stack in which a plurality of fuel cells are laminated, in a housing, the fuel cells being capable of obtaining electric power using a fuel gas which is a hydrogen-containing gas, and air which is an oxygen-containing gas. Moreover, there have been proposed a variety of fuel cell apparatuses of the type including such a fuel cell module and auxiliary machines required to operate the fuel cell module housed in a casing such as an exterior case (refer to WO 2009/119615 and Japanese Unexamined Patent Publication JP-A 2009-158121 (Patent Literatures 1 and 2), for example).

SUMMARY

A fuel cell module according to a non-limiting aspect of the present disclosure may include:

a cell stack device including a cell stack including an array of a plurality of fuel cells which carry out power generation by using an oxygen-containing gas and a fuel gas, a manifold which supplies a fuel gas to each of the fuel cells, and a reformer which reforms a raw fuel and produces the fuel gas;

an oxygen-containing gas flow channel through which the oxygen-containing gas flows;

an oxygen-containing gas introduction plate which supplies the oxygen-containing gas to each of the plurality of fuel cells;

a housing including an accommodation chamber which accommodates the cell stack device and the oxygen-containing gas introduction plate; and a plurality of insertion members inserted from an outside of the housing into the accommodation chamber, the plurality of insertion members being inserted through one surface of the housing.

A fuel cell apparatus according to a non-limiting aspect of the present disclosure may include: the fuel cell module described above; auxiliary machines which operate the fuel cell module; and an exterior case which houses the fuel cell module and the auxiliary machines therein.

BRIEF DESCRIPTION OF DRAWINGS

Other and further objects, features, and advantages of the disclosure will be more explicit from the following detailed description taken with reference to the drawings wherein.

DETAILED DESCRIPTION

Figure 1:
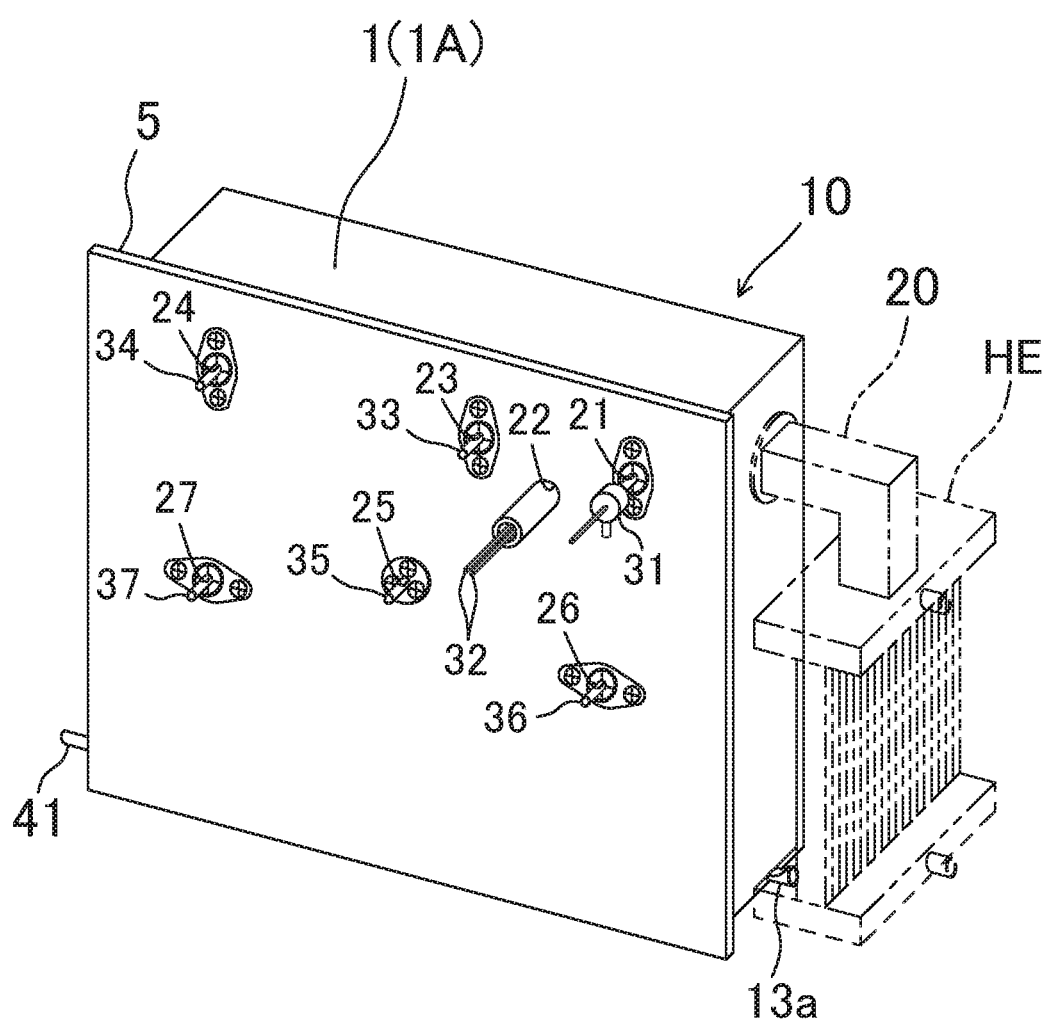
FIG. 1 is an external perspective view showing the structure of a fuel cell module according to a non-limiting aspect of the present disclosure.
Figure 2:
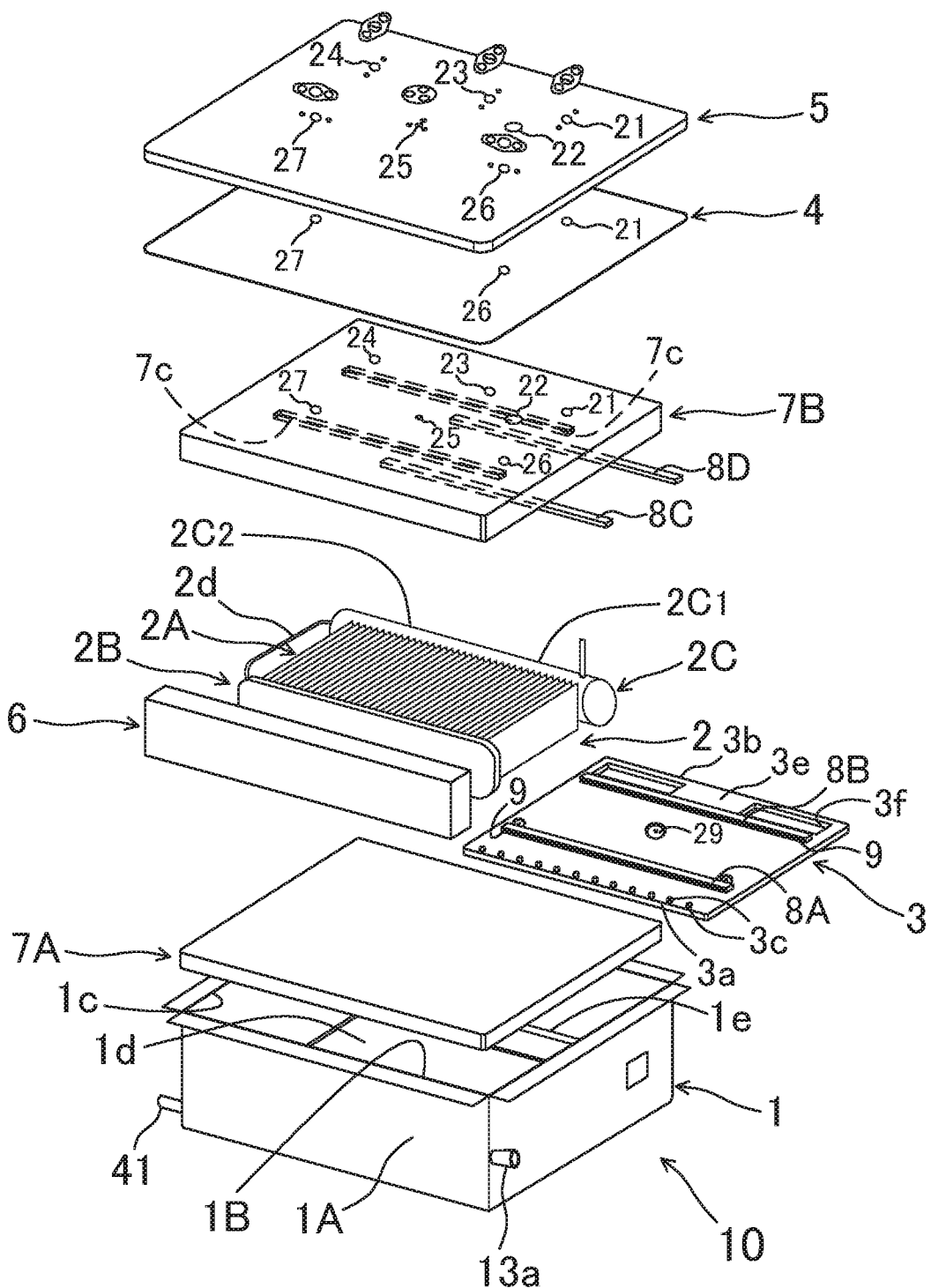
FIG. 2 is an exploded perspective view of the fuel cell module.
Figure 3:
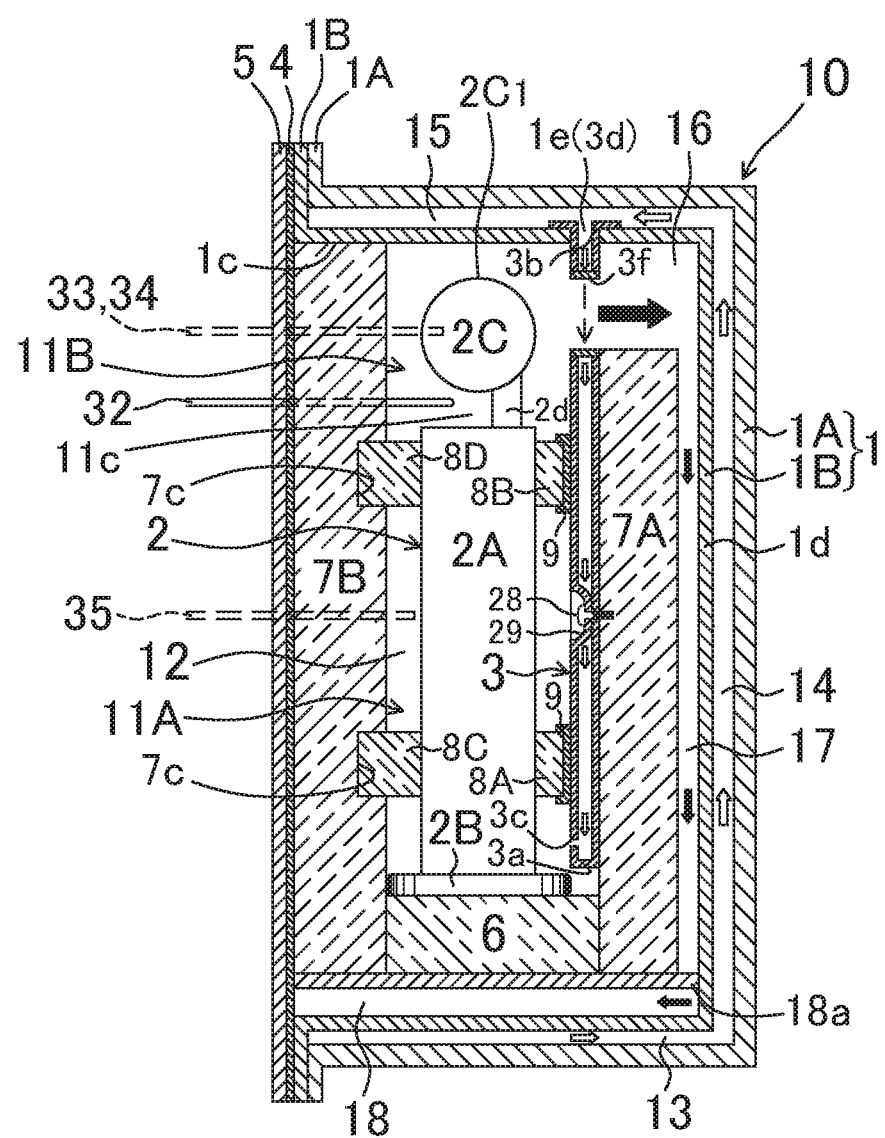
FIG. 3 is a vertical sectional view showing the internal arrangement of the fuel cell module.

FIG. 1 is an external perspective view showing a fuel cell module according to a non-limiting aspect of the present disclosure, as seen from one side. FIGS. 2 and 3 are an exploded perspective view and a sectional view, respectively, of the fuel cell module 10. In FIG. 2, the fuel cell module 10 is illustrated as being placed on a worktable or the like, with its wide opening 1c, which is an opening of a housing, facing upward for module assembling operation. Expressed differently, the fuel cell module 10 is illustrated as lying or reclining on its side. Following the completion of assembling operation, as shown in FIGS. 1 and 3, in preparation for transportation or usage, the fuel cell module 10 is oriented with the housing opening facing sideward so that a cell stack 2A can be erected, viz., stood upright. Moreover, in the drawing, the symbol HE represents a heat exchanger.

The fuel cell module 10 according to the non-limiting aspect of the present disclosure shown in the drawings includes a solid-oxide fuel cell (SOFC). As shown in FIGS. 1 and 3 that are each an as-built drawing, a housing 1 is in the form of a double housing including an inner case 1B and an outer cover 1A, with a gas flow channel formed in between. The housing 1 is internally provided with an internal heat insulator composed of a bottom heat insulator 6, side heat insulators 7A and 7B, etc. In a central interior space defined by the internal heat insulator, a power-generating chamber 11A and a combustion chamber 11B are provided. In the power-generating chamber 11A and the combustion chamber 11B, a cell stack device 2 including a cell stack 2A, a manifold 2B, a reformer 2C, etc. is housed. The power-generating chamber 11A and the combustion chamber 11B constitute an accommodation chamber 12.

The power-generating chamber 11A and the combustion chamber 11B may be made integral with each other. Moreover, the term "bottom" of the bottom heat insulator 6 and the term "side" of the side heat insulators 7A and 7B mean that they are positioned on the bottom side and the lateral side, respectively, in FIGS. 1 and 3 showing the operation state after assembly. In the case of assembling as shown in FIG. 2, the bottom heat insulator 6 is located on the lateral side of the cell stack 2A lying on its side. The side heat insulator 7A is located on such a bottom side of a box bottom portion 1d side of the inner case 1B that corresponds to the lower side of the cell stack 2A lying on its side. The side heat insulator 7B is located on the side of a closed plate 5 serving as an upper lid of the cell stack 2A lying on its side.

From the outside of the housing 1, insertion members required for operation of the fuel cell module 10, including sensors such as thermocouples 33, 34, and 35, and an ignition heater 32, are inserted into the accommodation chamber 12 of the fuel cell module through one side of the housing 1. In a non-limiting aspect of the present disclosure, the insertion members are each inserted through corresponding one of holes formed piercingly through the closed plate 5 which closes the wide opening 1c which is the opening of the housing 1. That is, in a non-limiting aspect of the present disclosure, the insertion is made via the first to fifth through holes, etc. The installation of the insertion members can be accomplished without the necessity of moving the fuel cell module 10 and changing its oriented position during the assembling operation. Instead of a rectangular prism as shown in the drawing, the shape of the housing 1 may be shaped in a polygonal column.

Moreover, as the housing 1, a double-structure housing 1 as shown in FIG. 2, which is a box body whose one side is widely opened. The wide opening 1c located on the upper side of the box body has such a size that the cell stack device 2 lying on its side as shown in the drawing can be inserted through the wide opening 1c into the box body from thereabove. In other words, the wide opening 1c has an opening length or opening diameter (being also called "diagonal length") greater than the side size of the cell stack device 2 including the manifold 2B and the reformer 2C.

That is, the size of the wide opening 1c is greater than the maximum length or the maximum cross-section diameter of the projected plane of the device as viewed from one side of the cell array of the cell stack device 2. This makes it possible to set the cell stack device 2 easily in a predetermined position in the housing 1 in one step without moving the cell stack device 2 around in the box-shaped housing 1.

The following describes the structure of the described fuel cell module 10, a module manufacturing method, and module assembling procedures.

The fuel cell module 10 includes, basically in bottom-to-top order in the exploded perspective view of FIG. 2, the housing 1, the side heat insulator 7A, an oxygen-containing gas introduction plate 3, cell stack-retaining heat insulators 8A and 8B, the cell stack device 2, the bottom heat insulator 6, the side heat insulator 7B, cell stack-retaining heat insulators 8C and 8D, a paper gasket 4, and the closed plate 5. The housing 1 includes the outer cover (1A) and the inner case (1B).

The side heat insulator 7A is that one of the side heat insulators located on the bottom side of the box body. The oxygen-containing gas introduction plate 3 supplies an oxygen-containing gas to fuel cells. The cell stack-retaining heat insulators 8A and 8B are rib-shaped members disposed on the upper surface of the oxygen-containing gas introduction plate 3.

The cell stack device 2 includes the cell stack 2A and the reformer 2C. The bottom heat insulator 6 is located on the side of the manifold 2B located on the lateral side of the cell stack device 2. The side heat insulator 7B is the other side heat insulator located on the opening side of the box body.

The cell stack-retaining heat insulators 8C and 8D are disposed on the lower surface side of the side heat insulator 7B so as to become paired with the cell stack-retaining heat insulators 8A and 8B, respectively. The inner case 1B is covered with the paper gasket 4 and the closed plate 5. Some of the constituent members may be omitted from the construction, or, other member may be added to the construction.

The constituent members, including the cell stack device 2, to be housed in the inner case 1B of the housing 1 are each made smaller than the wide opening 1c provided in the inner case 1B for the insertion of the cell stack device. More specifically, the oxygen-containing gas introduction plate 3, the bottom heat insulator 6, the side heat insulators 7A and 7B, the cell stack-retaining heat insulators 8A, 8B, 8C, and 8D, etc. are each made smaller than the wide opening 1c for cell stack device insertion of the inner case 1B.

These members can be easily inserted, through the wide opening 1c, into the box bottom portion 1d which corresponds to the bottom of the box body, seen from the opening. Thus, the assembling of the fuel cell module 10 can be achieved simply by placing the constituent members one after another in the direction from bottom to top as shown in FIG. 2.

Moreover, the oxygen-containing gas introduction plate 3 is inserted through an oxygen-containing gas outlet port 1e of a third flow channel 15 serving as an oxygen-containing gas flow channel situated at the inner wall of the inner case 1B. After being placed over the side heat insulator 7A, as shown in FIG. 3, the oxygen-containing gas introduction plate 3 is, at its inlet portion 3d-side base end 3b, secured to the oxygen-containing gas outlet port 1e by means of welding, screwing, or otherwise (not shown).

As the advantages of securing the oxygen-containing gas introduction plate 3 by welding, the cell stack device 2 is not subjected to welding-caused thermal influence, and, retention of hermeticity can be achieved with ease. This is because the cell stack device 2 is inserted after the weld-securing of the oxygen-containing gas introduction plate 3. Moreover, the oxygen-containing gas introduction plate 3 is located on the opposite side of the cell stack device 2 to a side facing the closed plate 5 which is the insertion side for sensors and auxiliary machines so as not to hinder the insertion operation. The way of securing the oxygen-containing gas introduction plate 3 is not limited to welding. For example, the oxygen-containing gas introduction plate 3 may be secured by screwing.

Following the completion of assembling operation, in the fuel cell module 10, now accommodating the cell stack device 2, a plurality of through holes, or more specifically, in a non-limiting aspect of the present disclosure, through holes 21 to 27, are provided so as to pass through the closed plate 5 serving as the upper surface of the fuel cell module 10, the paper gasket 4, and the side heat insulator 7B in order from the upper surface to the vicinity of the cell stack device 2.

Of the through holes 21 to 27, the through hole 21 is used for insertion of a raw fuel supply pipe which supplies a raw fuel to a vaporizing portion 2C1 of the reformer 2C, or more specifically, in a non-limiting aspect of the present disclosure, a dual gas pipe joint 31 for concurrent supply of a raw fuel and water for reforming.

The through hole 22 is used for insertion of the ignition heater 32. The through hole 23 is used for insertion of the thermocouple 33 which is disposed in the vaporizing portion 2C1 of the reformer 2C. The through hole 24 is used for insertion of the thermocouple 34 which is disposed in a reforming portion 2C2 of the reformer 2C. The through hole 25 is used for insertion of the thermocouple 35 which detects the temperature of the cell stack 2A.

Moreover, in the through holes 26 and 27, bus bars 36 and 37, respectively, for collecting electric power from both ends of the cell stack 2A in the stacking direction are inserted. The bus bars 36 and 37 are each attached to an end collector (not shown) disposed at each end of the cell stack 2A in the stacking direction prior to module assembling operation.

With respect to the bus bars 36 and 37, on assembling the earlier described side heat insulator 7B, paper gasket 4, and closed plate 5 into the fuel cell module 10, while the bus bar 36 is inserted in the holes provided in, respectively, the three members in advance (refer to FIG. 2; for example, the three holes 26 which define a continuous through hole 26), the respective members are assembled. Thus, as shown in FIG. 1, the fuel cell module 10 can be assembled in a state where the terminal portions of the bus bars 36 and 37 protrude from the surface of the closed plate 5. Changes may be made to the design of the described through holes in accordance with the number of insertion members. For example, some of the through holes may be omitted, or, an additional through hole may be provided.

In such fuel cell module assembling operation as described above, after placing a cell stack in a housing, other members such as a sensor, a heater, and ignition means are mounted around the cell stack. This mounting process is time-consuming, because it needs to be done in a narrow space within the housing with utmost care to avoid damage to the cell stack, etc. There is room for improvement from the point of view of module production efficiency.

In this regard, in accordance with the fuel cell module and the fuel cell apparatus according to a non-limiting aspect of the present disclosure, the fuel cell module and the fuel cell apparatus employing the fuel cell module can be built with high efficiency. That is, the fuel cell module 10 according to a non-limiting aspect of the present disclosure, regardless of whether it is in a state of lying on its side as shown in FIG. 2 or in a state of standing upright as shown in FIG. 1, can be built with ease in a short period of time. More specifically, with the opening of the housing 1 kept closed as described above, the insertion members which have to be placed near the cell stack 2A within the fuel cell module 10, such as the dual gas pipe joint 31, the ignition heater 32, and various sensors such as thermocouples used for measurement of the temperatures of the constituent members, are inserted through the corresponding through holes. This makes it possible to build the fuel cell module 10 according to a non-limiting aspect of the present disclosure with ease in a short period of time.

Thus, in the process of manufacturing the fuel cell module 10 according to a non-limiting aspect of the present disclosure, there is no need to move the cell stack device 2 around in the housing for the placement of the insertion members, and the cell stack device 2 can be readily set in a predetermined position in the housing in one step. Moreover, connection of piping, wiring, etc. can be carried out at the lid-side location where there is enough working room. This allows the connecting operation to be completed quickly with facility. Consequently, the process of manufacturing the fuel cell module 10 according to a non-limiting aspect of the present disclosure can be accomplished with greater module production efficiency.

Figure 4:
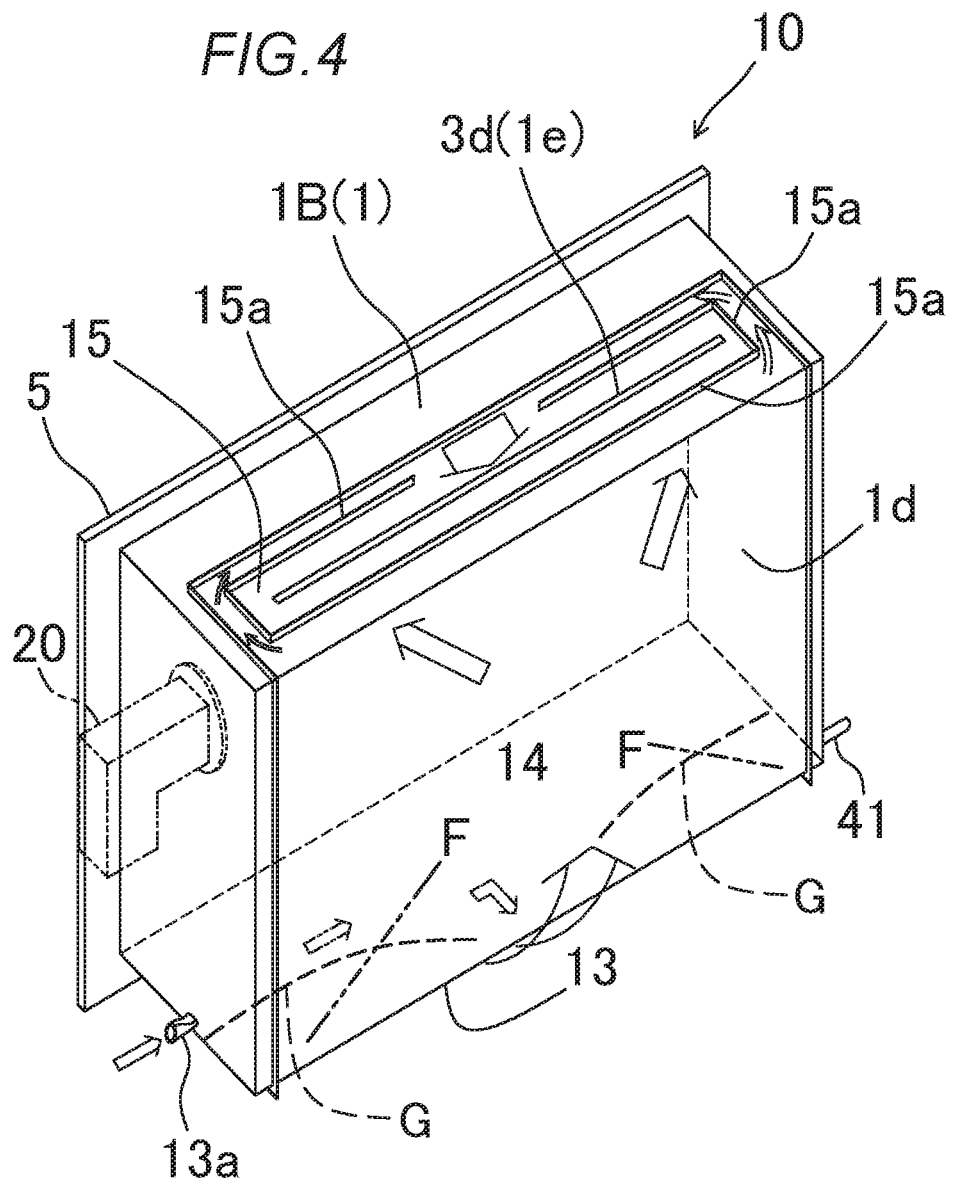
FIG. 4 is a view showing the arrangement of an airflow channel disposed inside an outer cover of a double housing of the fuel cell module.
Figure 5:
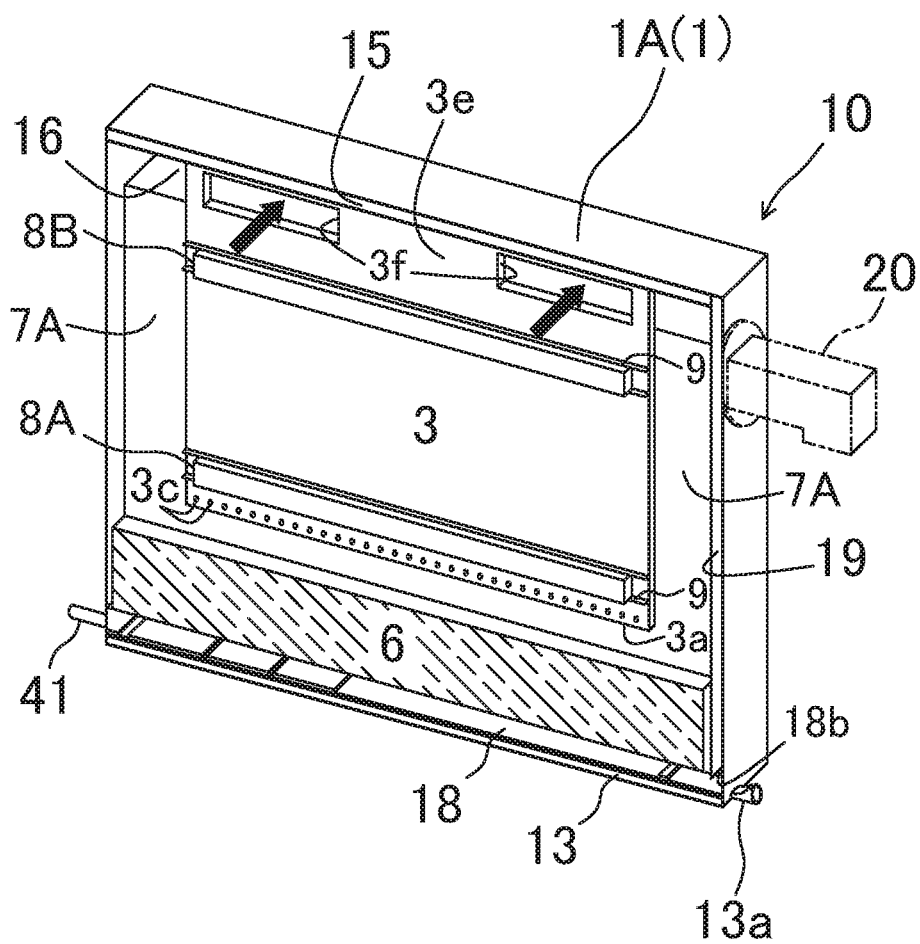
FIG. 5 is a half sectional view for explaining the shape of an oxygen-containing gas introduction plate mounted in the fuel cell module.
Figure 6:
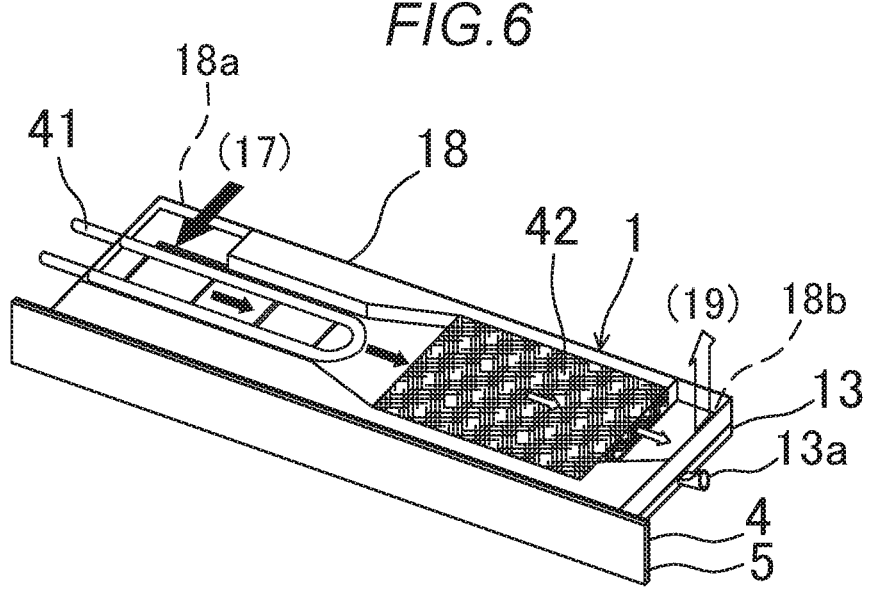
FIG. 6 is a half sectional view for explaining the configuration of the exhaust gas treatment chamber disposed at the bottom of the interior of the double housing of the fuel cell module.

Referring to the drawings including FIGS. 4 to 6, the constituent devices and members of the fuel cell module 10 assembled in the above-described manner and set within the housing 1 will be described. FIG. 4 is a view showing the arrangement of the airflow path disposed inside the outer cover of the double housing of the fuel cell module. FIG. 5 is a half sectional view for explaining the shape of the oxygen-containing gas introduction plate mounted in the fuel cell module. FIG. 6 is a half sectional view for explaining the configuration of an exhaust gas treatment chamber disposed at the bottom of the interior of the double housing of the fuel cell module.

As described earlier, the cell stack 2A, the manifold 2B, and the reformer 2C combine to form the cell stack device 2 accommodated in the accommodation chamber 12 composed of the lower-side power-generating chamber 11A and the upper-side combustion chamber 11B as seen in FIG. 3 in the housing 1. The accommodation chamber 12 refers to the space defined by the inner case 1B, the side heat insulators 7A and 7B, and the bottom heat insulator 6.

The cell stack 2A includes an array of upstanding columnar fuel cells of hollow flat type each including an internal fuel gas flow channel (not shown) through which a fuel gas flows in the longitudinal direction which corresponds to the vertical direction at the time of operation, and power-collecting members (not shown) which electrically connect adjacent fuel cells in series with each other. The fuel cell may be made as a columnar cell, and thus, for example, the fuel cell may be applied to the form of a cylindrical or stripe configuration.

As shown in FIG. 3, the cell stack 2A is accommodated in the power-generating chamber 11A of the accommodation chamber 12. The lower end of each fuel cell constituting the cell stack 2A is secured to the manifold 2B by an insulating joining material (not shown) such as a glass sealing material.

There is provided the reformer 2C, disposed above the cell stack 2A, or equivalently located on one side of the cell stack 2A lying on its side prior to assembling operation as shown in FIG. 2, for producing a fuel gas which is supplied to the fuel cells by reforming a raw fuel such as natural gas or kerosene. The fuel gas produced by the reformer 2C is supplied, through a fuel gas supply tube 2d (refer to FIG. 3), to the manifold 2B.

The fuel gas which has been supplied to the manifold 2B flows through the gas flow channel formed in the cell stack 2A from the lower end of the channel to the upper end thereof. Each fuel cell effects power generation by using this fuel gas and an oxygen-containing gas supplied thereto from a discharge port 3c of the oxygen-containing gas introduction plate 3 disposed on the lateral side of the fuel cells.

In the cell stack device 2, the oxygen-containing gas and excess fuel gas discharged from the terminal end of the fuel gas flow channel without serving for power generation are burned at the upper end of the cell stack 2A for the purposes of heating the reformer 2C and reforming the raw fuel. More specifically, the mixture of the excess fuel gas and the oxygen-containing gas is ignited to burn by the ignition heater 32 in a combustion area 11c situated between the cell stack 2A and the reformer 2C, and, the resultant combustion heat is utilized to heat the reformer 2C, as well as to reform the raw fuel. Thus, in the accommodation chamber 12, the upper high-temperature space located closer to the reformer 2C than the cell stack 2A is referred to as the combustion chamber 11B, whereas the lower low-temperature space located closer to the cell stack 2A is referred to as the power-generating chamber 11A.

The heat insulator is disposed around the cell stack device 2 to carry out heat insulation for the cell stack device 2, to allow the cell stack device 2 to be fixedly positioned, and to define the power-generating chamber 11A and the combustion chamber 11B constituting the accommodation chamber 12. As shown in FIG. 3, the heat insulator includes the large-sized side heat insulators 7A and 7B, each located on corresponding one of the opposite sides of the cell stack device 2; the cell stack-retaining heat insulators 8A and 8C, as well as the cell stack-retaining heat insulators 8B and 8D, located in an inside space between the side heat insulators, for supporting the cell stack device 2 between the cell stack-retaining heat insulators 8A and 8C, as well as between the cell stack-retaining heat insulators 8B and 8D; and the bottom heat insulator 6 located under the cell stack device 2. As the heat insulator, it is possible to use commonly-used heat-insulating materials, such for example as a heat insulator made of an alumina material, a silica material, or an alumina-silica material.

The cell stack device 2-side inward surface of the left-hand large-sized side heat insulator 7B, as seen in the drawing, is provided with groove-like recesses 7c and 7c. The cell stack-retaining heat insulators 8C and 8D are each fitted in corresponding one of the groove-like recesses 7c so as to support the cell stack device 2 in a predetermined appropriate position. On the other hand, the cell stack-retaining heat insulators 8A and 8B are each retained by a heat insulator securing member 9 disposed on the oxygen-containing gas introduction plate 3 so as to support the cell stack device 2 in a predetermined appropriate position.

Flow channels are provided in locations outside the bottom heat insulator 6 and the side heat insulator 7A, and between the outer cover 1A and the inner case 1B which correspond to the outer wall and the inner wall, respectively, of the double housing. For example, as shown in FIG. 3, there are provided flow channels 13, 14, and 15 for supplying an oxygen-containing gas to the cell stack device 2.

Moreover, there are provided flow channels 16, 17, and 19, etc. for conveying an exhaust combustion gas discharged from the cell stack device 2 to an exhaust gas treatment chamber 18 or the heat exchanger disposed externally of the module, etc. Note that each sectional view is a schematic diagram in which the flow channel is illustrated as having a thickness larger than its actual thickness, and, the overlapping relation between the flow channels in the thickness direction of the housing, or equivalently the direction from front to back of the paper sheet printed with the sectional view, channel's meandering configuration, alternative paths, and channel's three-dimensional geometry may not represented faithfully in the sectional view. Furthermore, the thicknesses and dimensions of other constituent components differ from their actual measurements.

The oxygen-containing gas flow channels 13, 14, and 15 include: an oxygen-containing gas inlet pipe 13a; the first oxygen-containing gas flow channel (the first flow channel 13); the second oxygen-containing gas flow channel (the second flow channel 14); and the third oxygen-containing gas flow channel (the third flow channel 15 and air reservoir).

The oxygen-containing gas inlet pipe 13a receives the oxygen-containing gas supplied from an auxiliary machine such as a non-illustrated air blower. The first oxygen-containing gas flow channel is located at the bottom of the interior of the housing. The second oxygen-containing gas flow channel is opposed to a first exhaust gas flow channel 17 (exhaust gas pocket) as described later so as to act mainly to carry out heat exchange with an exhaust gas. The third oxygen-containing gas flow channel allows the oxygen-containing gas to be further heated at an upper part of the housing.

As shown in FIG. 3, the upper third flow channel 15 makes connection with the oxygen-containing gas introduction plate 3 formed so as to extend from the third flow channel 15 toward the lower manifold 2B in hanging-down fashion. The heated oxygen-containing gas is supplied to a point near the lower end of the columnar cell stack 2A, and from there directly to the lower end of the cell stack 2A.

Moreover, the oxygen-containing gas which has been supplied to the lower end of the cell stack 2A further travels along the exterior of each columnar fuel cell toward the accommodation chamber 12 located at the upper end of the cell stack 2A.

Referring to FIG. 4, the second flow channel 14 and the third flow channel 15 will be described in more detail. FIG. 4 is a view of the fuel cell module with the outer cover 1A of the housing 1 removed. After flowing through the first flow channel 13 at the bottom of the interior of the housing, the oxygen-containing gas (air as indicated by a blanked white arrow) flows from the central part of the bottom into the second flow channel 14 running along the box bottom portion 1d of the inner case 1B corresponding to the wide side face of the fuel cell module 10.

After flowing into the second flow channel 14, the oxygen-containing gas flows upward, during which period the oxygen-containing gas is warmed under the effect of heat exchange with the high-temperature exhaust gas flowing internally through the first exhaust gas flow channel 17 (refer to FIG. 3) located inside the second flow channel 14, with the box bottom portion 1d lying in between. After passing through the second flow channel 14, the oxygen-containing gas flows into the third flow channel 15 located at an upper part of the housing.

Moreover, as shown in FIG. 4, a straightening plate 15a substantially U-shaped in plan configuration is disposed around the slit-like inlet portion 3d of the oxygen-containing gas introduction plate 3 in the third flow channel 15. This prevents the oxygen-containing gas, which has flowed from the box bottom portion 1d of the inner case 1B corresponding to one side of the module box body around to the upper surface of the box body, from directly reaching the slit-like inlet portion 3d of the oxygen-containing gas introduction plate 3.

That is, the straightening plate 15a allows the oxygen-containing gas introduced in the oxygen-containing gas introduction plate 3 to flow while circumventing the area around the inlet portion 3d as indicated by the blanked white arrow. In this case, the oxygen-containing gas flow channel at the upper surface of the box body can be lengthened, and, the oxygen-containing gas warmed at the side face of the box body can be further warmed during its circumventive travel around the straightening plate 15a. Moreover, the temperature of the oxygen-containing gas supplied to the cell stack 2A rises, thereby improving power generation efficiency.

The configuration of the straightening plate 15a of the third flow channel 15 at the upper surface of the inner case 1B is described merely by way of example without limitation. It is possible to use a similar straightening plate having a different shape or a different channel form, or, in another alternative, the third flow channel in itself may be configured to allow the oxygen-containing gas to circumvent the inlet portion 3d of the oxygen-containing gas introduction plate 3.

Moreover, the configuration of the second flow channel 14 located on the box bottom portion 1d side of the inner case 1B corresponding to one side of the module box body is not limited to the example as disclosed in a non-limiting aspect of the present disclosure. For example, an additional straightening plate or the like may be disposed in each of locations F and F indicated by a chain double-dashed straight line as shown in FIG. 4. Thus, by providing the box bottom portion 1d of the inner case 1B corresponding to the wide side face of the module box body with such a straightening plate whereby the oxygen-containing gas flowing along the side collects and is directed toward the central high-temperature region, it is possible to raise the temperature of the oxygen-containing gas flowing along the side of the module box body even further.

Moreover, a straightening plate or the like similar to the above-described additional straightening plate may be disposed over the first flow channel 13 at the bottom of the box body, and more specifically, for example, in each of locations G and G of the line indicated by a broke line on the bottom. This straightening plate may be made to define a flow channel centrally constricted to provide an air exit (air outlet) relative to the second flow channel 14. That is, the shape of the straightening plate or the like or the flow channel arrangement may be suitably changed.

Next, for example, the oxygen-containing gas introduction plate 3, which supplies the oxygen-containing gas having an elevated temperature as described above to the cell stack 2A, is obtained by assembling two thin platy members into a hollow thick plate. The plate width of the oxygen-containing gas introduction plate 3 is substantially equivalent to the length of the cell stack 2A in the cell-arranging direction.

The upper base end 3b located closer to the third flow channel 15 for the inflow of oxygen-containing gas as seen in FIG. 3, constitutes the inlet portion 3d in the form of a slit opening extending in the width direction of the introduction plate, as shown in FIG. 4. A lower front end 3a of the oxygen-containing gas introduction plate 3 located closer to the cell stack 2A as seen in FIG. 3, is provided with an oxygen-containing gas discharge port 3c spaced slightly away from the edge of the front end.

There are provided a plurality of oxygen-containing gas discharge ports 3c, each in the form of a small hole formed so as to pass through one of the two thin plate-like members, that are arranged in a width direction thereof at predetermined spacing under normal circumstances. Thus, the oxygen-containing gas introduction plate 3 is capable of efficient delivery of the oxygen-containing gas warmed in the second flow channel 14 and the third flow channel 15 as described above to the lower end of the columnar cell stack 2A.

Moreover, as shown in the fragmentary sectional view of FIG. 5, a through opening is provided as an exhaust gas vent port 3f in the upper part of the oxygen-containing gas introduction plate 3 located toward the inlet portion 3d or the base end 3b. The exhaust gas vent port 3f allows the exhaust combustion gas generated in the combustion chamber 11B located above the cell stack 2A to pass therethrough in a direction perpendicular to the wide surface of the oxygen-containing gas introduction plate 3 toward the upper space 16 of the first exhaust gas flow channel 17 for allowing the exhaust combustion gas to flow toward the side opposite to the cell stack device 2. The exhaust gas vent ports 3f are provided on the vaporizing portion 2C1 side of the reformer 2C (which in the drawing is a right-hand location) and on the reforming portion 2C2 side of the reformer 2C (which in the drawing is a left-hand location).

While there are provided two exhaust gas vent ports 3f located on the vaporizing portion 2C1 side and the reforming portion 2C2 side, respectively, of the reformer 2C in a non-limiting aspect of the present disclosure, at least one of the exhaust gas vent ports 3f may be located on the vaporizing portion 2C1 side. In this case, the high-temperature exhaust gas flows near the vaporizing portion 2C1 of the reformer 2C, thus keeping the vaporizing portion 2C1 at high temperature.

After passing through the exhaust gas vent ports 3f and 3f penetrating the oxygen-containing gas introduction plate 3 (refer to FIG. 5), the high-temperature exhaust combustion gas (hereafter referred to as the exhaust gas) is discharged into the upper space 16 which is the space located above the side heat insulator 7A. Subsequently, the exhaust gas is directed, through the laterally-disposed first exhaust gas flow channel 17 communicating with the space (exhaust gas pocket located inwardly of the inner case 1B), into the exhaust gas treatment chamber 18 located on the bottom of the housing 1. The exhaust gas is subjected to treatment process within the exhaust gas treatment chamber 18.

The exhaust gas treatment chamber 18 is provided so as to extend, along the bottom of the interior of the housing 1 of the module, in a direction from the reforming portion 2C2 of the reformer 2C (from the rear-left hand side in the drawing) to the vaporizing portion 2C1 of the reformer 2C (to the front-right hand side in the drawing). Inside the exhaust gas treatment chamber 18, as shown in the fragmentary sectional view of FIG. 6 showing the bottom part of the module, a heater 41 for exhaust gas reheating and a combustion catalyst 42 which purifies an exhaust gas are provided. While the heater 41 is illustrated as being inserted through a different side than a side through which the insertion member is inserted in a non-limiting aspect of the present disclosure, like the insertion member, the heater 41 may be inserted through the closed plate 5. The heater 41 may be omitted from the construction.

Moreover, after flowing through the above-described first exhaust gas flow channel 17, the exhaust gas is, as indicated by a solid black arrow shown in FIG. 6, introduced into the exhaust gas treatment chamber 18 from an exhaust gas inlet port 18a provided at one side (which in the drawing is the rear-left hand side) of the exhaust gas treatment chamber 18. Subsequently, the exhaust gas is subjected to treatment process while flowing through the inside of the exhaust gas treatment chamber 18 in one direction from the rear side to the front side, and is thereafter, as indicated by a blanked white arrow, passed out from an exhaust gas outlet port 18b formed at the other side (which in the drawing is the front-right hand side) of the exhaust gas treatment chamber 18.

After passing out from the exhaust gas outlet port 18b located at the front side (which in the drawing is the right hand side) and directed upward, the exhaust gas is, as shown in FIG. 5, allowed to flow upward on the inner side of the narrow side face of the housing 1 by a second exhaust gas flow channel 19 located on the vaporizing portion 2C1 side of the reformer 2C (on the front-right hand side in the drawing). Subsequently, the exhaust gas flows into the heat exchanger HE disposed on the outside of the fuel cell module 10 through an exhaust gas outlet port 20 serving as a port for connection with the heat exchanger located at the upper part of the second exhaust gas flow channel 19.

The direction in which the exhaust gas flows through the exhaust gas treatment chamber 18 may be the reverse of that shown in FIG. 6, that is, the exhaust gas may be allowed to flow from the front side to the rear side. In this case, the exhaust gas inlet port 18a may be provided at the other side (which in the drawing is the front-right hand side) of the exhaust gas treatment chamber 18, whereas the exhaust gas outlet port 18b may be provided at one side (which in the drawing is the rear-left hand side) of the exhaust gas treatment chamber 18. At this time, the heater 41 for exhaust gas reheating is disposed at the front side, whereas the combustion catalyst 42 which purifies an exhaust gas is disposed at the rear side, as seen in the drawing. Moreover, the second exhaust gas flow channel 19 and the exhaust gas outlet port 20 are disposed at the rear-side narrow side face of the housing 1 that is not visible in the drawing, and, the heat exchanger HE located outside the module is disposed on the rear side of the housing 1.

In the fuel cell module 10 thereby constructed according to a non-limiting aspect of the present disclosure, auxiliary machines, sensors, etc. can be easily mounted without the necessity of moving the module casing around and changing its oriented position during the assembling operation. This can reduce the time and cost required for the module assembling operation. Moreover, since the temperature of the oxygen-containing gas supplied to the cell stack 2A rises, it is possible to improve power generation efficiency in the fuel cell.

In addition, the fuel cell module 10 and the heat exchanger HE are located side by side in the longitudinal direction of the fuel cell module 10. This makes it possible to design the module to have a smaller width, and thereby render the fuel cell module lower in profile and compact.

Figure 7:
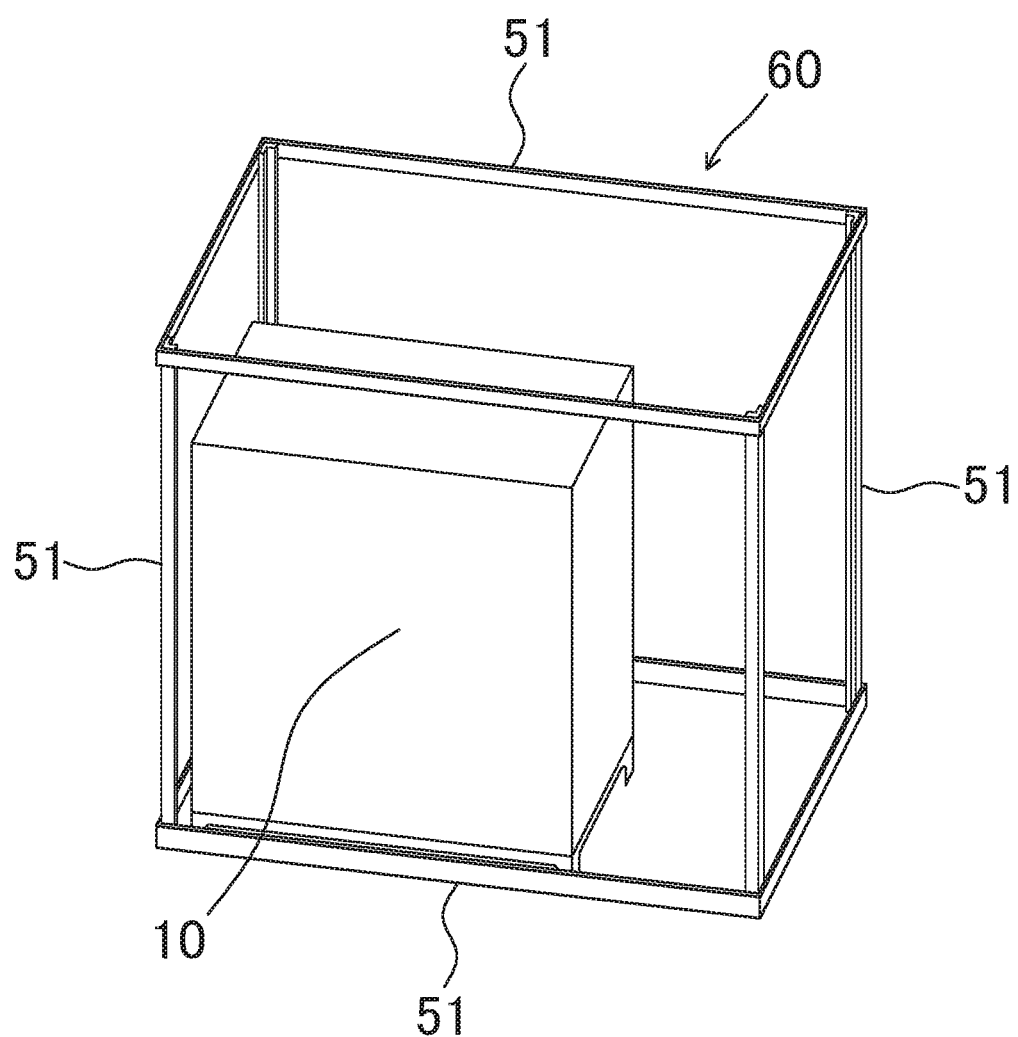
FIG. 7 is a schematic drawing showing the structure of a fuel cell apparatus using the fuel cell module according to a non-limiting aspect of the present disclosure.

FIG. 7 is a transparent perspective view showing an example of a fuel cell apparatus 60 including the fuel cell module 10 and auxiliary machines for operating the fuel cell module 10 housed in an exterior case 50. In FIG. 7, the auxiliary machines used for the operation of the module, various sensors, piping and wiring arrangement and so forth, and a decorative panel used as an exterior plate are not shown.

The fuel cell apparatus 60 is constructed by housing the above-described fuel cell module 10 according to a non-limiting aspect of the present disclosure in the exterior case 50 composed of supports 51 and an exterior plate (not shown). In the exterior case 50, in addition to the illustrated fuel cell module 10, various auxiliary machines such as a heat storage tank, a power conditioner for supplying generated electric power externally, a pump, and a controller are located.

In such a fuel cell apparatus 60, the fuel cell module 10 of compact design, the heat exchanger, various auxiliary machines, etc. are housed in a single exterior case 50, And therefore this makes it possible to reduce the height and width of the exterior case 50, and thereby reduce the size of the fuel cell apparatus as a whole.

Moreover, in the case where the above-described low-profile fuel cell module 10 is used, the fuel cell apparatus as a whole is downsized, and, the downsized fuel cell apparatus can be placed even in a narrow elongate space with a short depth, such as a space under the eaves of an independent residential house. Thus, the fuel cell apparatus 60 according to a non-limiting aspect of the present disclosure allows a wider range of choice in the location where the apparatus is to be installed, that is, imparts greater flexibility in installation site.

The embodiments of the disclosure have been described in detail, it being understood that the disclosure is not limited to the above-described embodiments, and, various changes, modifications, and improvements are possible therein without departing from the scope of the disclosure.

Moreover, the form of the cell stack is not limited to an array of cells, and thus, it is possible to use a cell stack device including a cell stack including cells placed in a different arrangement. In addition, the housing may be given other shape than a rectangular prism shape or a cylindrical shape in conformance with the geometry or outside shape of the cell stack device, for example, the shape of a cube or rectangular column.

The disclosure may be embodied in other specific forms without departing from the spirit or essential characteristics thereof. The present non-limiting embodiments are therefore to be considered in all respects as illustrative and not restrictive, the scope of the disclosure being indicated by the appended claims rather than by the foregoing description and all changes which come within the meaning and the range of equivalency of the claims are therefore intended to be embraced therein.

REFERENCE SIGNS LIST

1: Housing
1c: Wide opening
2: Cell stack device
2A: Cell stack
2B: Manifold
2C: Reformer
3: Oxygen-containing gas introduction plate
3d: Inlet portion
10: Fuel cell module
13: First flow channel
14: Second flow channel
15: Third flow channel
17: First exhaust gas flow channel
18: Exhaust gas treatment chamber
19: Second exhaust gas flow channel
20: Exhaust gas outlet port
60: Fuel cell apparatus

What is claimed is:

1. A fuel cell module, comprising:
a cell stack device comprising a cell stack comprising an array of a plurality of fuel cells configured to carry out power generation using an oxygen-containing gas and a fuel gas, a manifold configured to supply the fuel gas to each of the plurality of fuel cells, and a reformer configured to reform a raw fuel and produce the fuel gas;
an oxygen-containing gas flow channel through which the oxygen-containing gas is configured to flow;
an oxygen-containing gas introduction plate which is configured to supply the oxygen-containing gas to each of the plurality of fuel cells;
a housing comprising an accommodation chamber which accommodates the cell stack device and the oxygen-containing gas introduction plate; and
a plurality of insertion members inserted from an outside of the housing into the accommodation chamber,
wherein
the housing has a rectangular prism form and comprises a box body of which a single side is opened to provide an opening that faces a lateral side of the array of the plurality of fuel cells, and a lid that closes the opening, and
the plurality of insertion members are inserted through the lid.

2. The fuel cell module according to claim 1, wherein the opening of the box body has an opening length which is greater than a maximum length of a projected plane of the cell stack device as viewed from a side of the cell stack device.

3. The fuel cell module according to claim 1, wherein the oxygen-containing gas introduction plate is located on an opposite side to an insertion side of the plurality of insertion members, with respect to the cell stack device.

4. The fuel cell module according to claim 1, wherein the oxygen-containing gas flow channel merges with an inlet portion of the oxygen-containing gas introduction plate, and the inlet portion of the oxygen-containing gas introduction plate is connected to the oxygen-containing gas introduction plate and is configured so that after the oxygen containing gas flows around the inlet portion, the oxygen containing gas flows into the oxygen-containing gas introduction plate.

5. The fuel cell module according to claim 1, wherein the oxygen-containing gas flow channel comprises a first flow channel running below the cell stack device and a second flow channel running along a side of the cell stack device, the second flow channel merging with the first flow channel, and the first flow channel is configured to introduce the oxygen-containing gas into a part of the second flow channel that faces a central area of the side of the cell stack device after flowing through the first flow channel.

6. The fuel cell module according to claim 1, wherein the reformer comprises a vaporizing portion configured to vaporize water for reforming, and a reforming portion configured to reform a raw fuel by using steam, and the oxygen-containing gas introduction plate is provided with a through opening located near the vaporizing portion of the reformer, the through opening configured to allow an exhaust gas left unused for power generation in the plurality of fuel cells to flow toward a side opposite to the cell stack device, and the fuel cell module further comprises a first exhaust gas flow channel merging with the through opening and running along the side of the cell stack device.

7. The fuel cell module according to claim 6, wherein an exhaust gas treatment chamber comprising a combustion catalyst for exhaust gas treatment is disposed below the cell stack device, and the first exhaust gas flow channel merges, at its part located close to an end of the reforming portion or an end of the vaporizing portion, with the exhaust gas treatment chamber.

8. The fuel cell module according to claim 7, further comprising:

a second exhaust gas flow channel located close to the vaporizing portion of the reformer disposed on a lateral side of the cell stack device, the second exhaust gas flow channel configured to allow the exhaust gas which has passed flowingly through the exhaust gas treatment chamber to flow upward along a side face of the box body, and an exhaust gas outlet port is disposed at an upper part of the second exhaust gas flow channel configured to allow exit of the exhaust gas.

9. A fuel cell apparatus, comprising:

the fuel cell module according to claim 1;

auxiliary machines which operate the fuel cell module; and an exterior case which houses the fuel cell module and the auxiliary machines therein.

* * * * *